(12) United States Patent
Collier et al.

(10) Patent No.: US 8,774,857 B2
(45) Date of Patent: Jul. 8, 2014

(54) SCHEMES FOR THE EFFICIENT RECEPTION OF RADIO COMMUNICATIONS SIGNALS

(75) Inventors: James Digby Yarlet Collier, Stradishall (GB); Andrei Popescu, Cambridge (GB); David Chappaz, Cambridge (GB)

(73) Assignee: Cambridge Silicon Radio Limited, Cambridgeshire (GB)

( * ) Notice: Subject to any disclaimer, the term of this patent is extended or adjusted under 35 U.S.C. 154(b) by 125 days.

(21) Appl. No.: 12/784,125

(22) Filed: May 20, 2010

(65) Prior Publication Data

US 2011/0065382 A1   Mar. 17, 2011

(30) Foreign Application Priority Data

May 21, 2009  (GB) .................................. 0908801.4

(51) Int. Cl.
*H04M 1/00*  (2006.01)
*H04B 5/00*  (2006.01)
*H04B 1/00*  (2006.01)

(52) U.S. Cl.
USPC ........................ 455/552.1; 455/41.1; 375/148

(58) Field of Classification Search
USPC ............ 455/41.1–41.2, 73, 78, 115.1–115.4, 455/123, 116, 127.4, 553.1, 552.1; 330/98–100; 375/148, 346
See application file for complete search history.

(56) References Cited

U.S. PATENT DOCUMENTS

| 7,283,840 B2* | 10/2007 | Cho ............................ 455/552.1 |
| 2006/0106850 A1* | 5/2006 | Morgan et al. ................. 707/101 |
| 2006/0200843 A1* | 9/2006 | Morgan et al. ................... 725/80 |
| 2006/0262739 A1* | 11/2006 | Ramirez et al. ............... 370/311 |
| 2007/0060055 A1* | 3/2007 | Desai et al. .................. 455/41.2 |
| 2008/0139118 A1* | 6/2008 | Sanguinetti ................... 455/41.2 |
| 2008/0139217 A1* | 6/2008 | Alizadeh-Shabdiz et al. ......................... 455/456.1 |
| 2008/0238807 A1* | 10/2008 | Ibrahim et al. ................ 343/876 |
| 2009/0190633 A1* | 7/2009 | Smith ........................... 375/148 |
| 2010/0029204 A1* | 2/2010 | Gao et al. ..................... 455/41.2 |

* cited by examiner

*Primary Examiner* — Andrew Wendell
*Assistant Examiner* — Cindy Trandai
(74) *Attorney, Agent, or Firm* — Pillsbury Winthrop Shaw Pittman LLP

(57) ABSTRACT

Receiving a Wi-Fi radio signal using a Bluetooth receiver architecture. Also, adapting a Wi-Fi receiver architecture to constrain a received radio signal to less than the bandwidth of a conveyed Wi-Fi signal for subsequent processing purposes.

15 Claims, 3 Drawing Sheets though some that one would consider to be out of range for communications based on a specifically designed Wi-Fi receiver chain. This places a limit on the practical utility of using the Bluetooth transceiver 12 for Wi-Fi reception. Therefore, the inventors propose to use the Bluetooth transceiver 12 for Wi-Fi reception only in situations where Wi-Fi reception would be of benefit to the operation of the cell phone 10.

SCHEMES FOR THE EFFICIENT RECEPTION OF RADIO COMMUNICATIONS SIGNALS

CROSS-REFERENCE TO RELATED APPLICATION

The present application claims priority to Great Britain Patent Application No. 0908801.4, filed May 21, 2009, the entire disclosures of both which are incorporated by reference herein.

FIELD

The invention relates to radio communications schemes, such as Bluetooth® and Wi-Fi®.

BACKGROUND

Wi-Fi is a medium range radio telecommunication technique based on the IEEE 802.11™ wireless local area network standards. The effective range of Wi-Fi is usually tens to hundreds of meters. A typical use of Wi-Fi is to provide a personal computer with a wireless connection to an access point serving as a gateway to a network, such as the Internet. The access point sends out frames of data. Some of these frames are broadcasts containing information for all potential and actual users of the access point. Wi-Fi can operate in the 2.4 GHz ISM band, where normally these broadcasts are transmitted using the lowest of the data rates that are specified in the standards, by means of direct sequence spread spectrum (DSSS) signals. Several varieties of Wi-Fi exist. See, for example, the different variants described in the IEEE 802.11b™ and IEEE 802.11g™ standards, more recently incorporated in the IEEE 802.11-2007 standard.

Bluetooth is a relatively short range radio telecommunication technique (the effective range is usually less than 10 meters). Bluetooth is usually used to provide a wireless link between a personal computer and a peripheral device such as a keyboard, a mouse or a radio telephone handset (i.e., a "mobile phone" or a "cell phone"). Another common use of Bluetooth is to connect a cell phone to an audio headset. Bluetooth signals are transmitted in the 2.4 GHz ISM band.

SUMMARY

The invention is defined by the appended claims to which reference should now be made.

BRIEF DESCRIPTION OF THE FIGURES

By way of example only, certain embodiments of the invention will now be described in more detail with reference to the accompanying drawings, in which.

DETAILED DESCRIPTION

Figure 1:
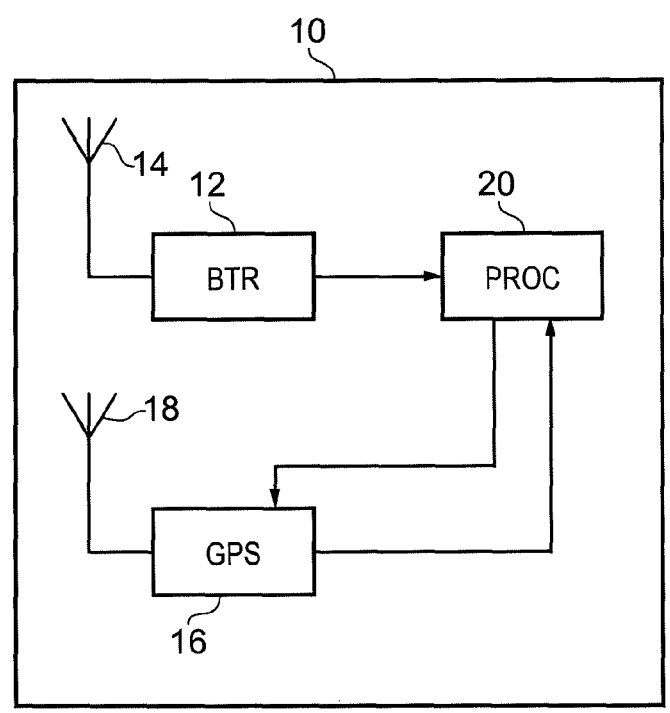
FIG. 1 is a block diagram schematically illustrating a cell phone.

FIG. 1 shows a cell phone 10 including a Bluetooth transceiver 12 with an antenna 14, a Global Positioning System (GPS) receiver 16 with an antenna 18, and a digital data processor 20. A person skilled in the field of digital radio communications will appreciate that the cell phone 10 will in practice include many more elements besides those that are shown in FIG. 1. FIG. 1 and the other figures show only those elements that are apt for providing a succinct description of the invention.

The Bluetooth transceiver 12 can establish a bidirectional Bluetooth link to a host device, such as personal computer. The processor 20 can send data to, and receive data from, the host device via the Bluetooth transceiver 12 using Bluetooth protocols.

The GPS receiver 16 acquires signals from satellites and performs mathematical calculations on these signals in order to determine the location of the cell phone 10. These calculations can be quite time consuming (in terms of instruction cycles) and therefore can represent a considerable drain on the battery (not shown) that powers the cell phone 10. The GPS receiver 16 supplies the determined location to the processor 20 so that the processor can offer location based services, such as directions to a selection of nearby restaurants, to the user of the cell phone 10.

The Bluetooth transceiver 12 is designed to operate with Bluetooth signals in the 2.4 GHz ISM band. The inventors therefore decided to explore whether the Bluetooth transceiver 12 could be used to receive Wi-Fi radio signals occupying that band, specifying (directly or indirectly) the location of the access point originating the broadcast messages.

The bandwidth of Bluetooth signals is about 1 MHz. Accordingly, the channel selection filtering in the Bluetooth transceiver 12 is implemented in the form of analogue intermediate frequency (IF) channel filtering down to a bandwidth of 4 MHz, which is enough to loosely bound a typical Bluetooth signal having a 1 MHz bandwidth, followed by sharper filtering down to the 1 MHz signal bandwidth being performed in the digital domain. It is undesirable to implement the final, precise element of the channel selection filtering in analogue domain for several reasons, including the variation of analogue component values from their nominal values and also the tendency of component values to vary with environmental changes.

802.11b/g Wi-Fi signals in the 2.4 GHz ISM band have a bandwidth of about 20 MHz. Therefore, when the Bluetooth transceiver 12 is used to receive Wi-Fi signals in that band, a 4 MHz wide analogue channel filtering in the Bluetooth transceiver 12 eliminates about 16 MHz of the bandwidth of the Wi-Fi signals, such that digital radio designers would eschew the idea of attempting to receive a Wi-Fi signal using such a receiver chain; i.e., they would reject the notion of planning a Wi-Fi receiver design that imposed channel filtering to a bandwidth narrower than the 20 MHz since that would throw away useful signal energy that could be used to improve the data throughput or range of the Wi-Fi link. Certainly, the idea of planning out a Wi-Fi receiver design with channel selection filtering that is 4 MHz wide for receiving 20 MHz wide Wi-Fi signals would be entirely inconceivable to such designers.

All that said, the inventors in their investigations have surprisingly found that the Bluetooth transceiver 12 can successfully receive Wi-Fi signals in the 2.4 GHz ISM band, albeit at reduced sensitivity. This reduction in sensitivity in practice puts a lower limit (as compared with a transceiver specifically designed for Wi-Fi) on the range within which a Wi-Fi access point must lie in order for successful Wi-Fi communications to be conducted. Thus, the inventors have discovered that the Bluetooth transceiver 12, although not being designed for Wi-Fi communication, can, provided that the access point is within a limited range, receive Wi-Fi signals in the 2.4 GHz ISM band, and in particular those Wi-Fi signals specifying the location of the access point originating the broadcast messages.

Accordingly, the processor 20 is designed to utilise the Bluetooth transceiver 12 to receive Wi-Fi signals in the 2.4 GHz band and to decode from DSSS broadcast messages in those Wi-Fi signals the location of the nearby access point that is the source of the Wi-Fi signals. For example, the Bluetooth transceiver 12 may receive DSSS beacon frames sent by an access point, recover the access point's MAC address as embedded in those frames and look up a (usually) coarse location for the access point in a database. Furthermore, the processor 20 is designed to communicate this location to the GPS receiver 16. The GPS receiver 16 is adapted to use that location as a rough estimate of the position of the cell phone 10 to, through known techniques, reduce the time, effort and battery drain involved in calculating an accurate position for the cell phone 10 from GPS signals received via antenna 18. (In a variant, the processing necessary to infer a coarse location from the raw data provided by a Wi-Fi signal could be carried out inside the GPS receiver 16.) The coarse location given by the MAC address can be presented to the user of the cell phone 10 either whilst the GPS receiver 16 is calculating an accurate position or instead of a GPS calculated position in the event that the too few satellites are visible to the GPS receiver 16 to permit the GPS receiver to calculate a position.

It will now be appreciated that the concept of the invention is that of receiving a digitally modulated signal using a receiver whose bandwidth is substantially less than the bandwidth of the wanted signal component present at the receiver input. The inventors have realised that this can be exploited in other ways in the field of Wi-Fi communications, and some examples will now be offered.

Figure 2:
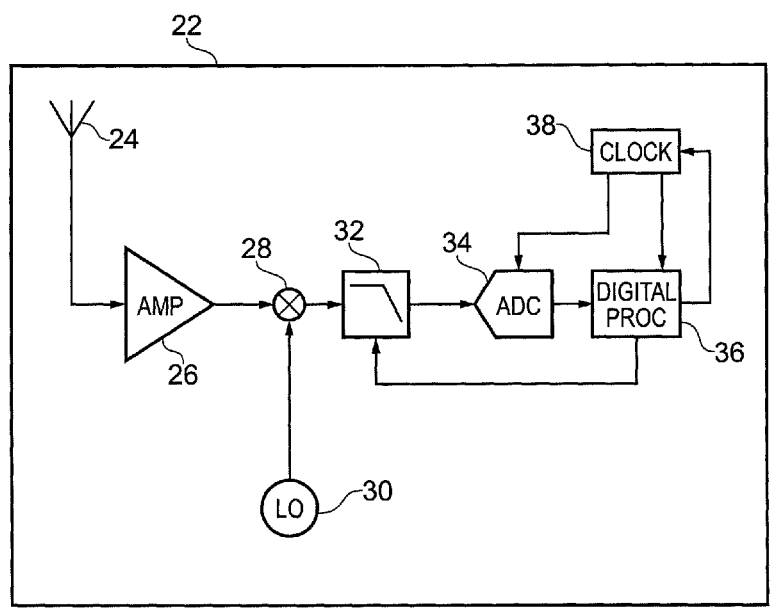
FIG. 2 is a block diagram schematically illustrating a lap top computer.

FIG. 2 shows a lap top computer 22 with a Wi-Fi transceiver that includes an antenna 24, an amplifier 26, a mixer 28, a local oscillator 30, an analogue filter 32, an analogue to digital converter 34, a digital data processor 36 and a clock generator 38. A radio signal received at the antenna 24 is amplified by amplifier 26 and down-converted in frequency by mixer 28 acting in concert with local oscillator 30. The down-converted signal is then filtered by analogue filter 32 to select a channel in the radio signal that contains a desired Wi-Fi transmission. The Wi-Fi signal thus isolated by the filter 34 is converted into a digital signal by the analogue to digital converter 34. The digitised Wi-Fi signal is then processed by the digital processor 36 (e.g. to recover information content). The analogue to digital converter 34 and the processor 36 operate at a processing rate that is determined by a clock signal that is delivered from the clock generator 38. The parameters of the filter 32 and the clock rate of the clock 38 are adjustable under the control of the processor 36. (Of course, the Wi-Fi transceiver in the lap top computer 22 is also capable of transmitting Wi-Fi signals but that aspect of its design is not discussed here since it is irrelevant to the present invention and in any case is conventional and well understood by digital radio communication system designers.)

As mentioned earlier, the inventors have discovered that it is possible to receive 20 MHz Wi-Fi signals in the 2.4 GHz ISM band with reduced sensitivity with an analogue channel selection filter that is 4 MHz wide. The filter 32 is adjustable under the direction of the processor 36 to switch between a configuration in which its bandwidth is just over 20 MHz wide and a configuration in which its bandwidth is 4 MHz wide. The information content of a signal with a bandwidth of 4 MHz can be adequately represented in the digital domain using a sample rate that is lower than the sample rate that is needed to adequately represent a signal with a 20 MHz bandwidth. Therefore, when the processor 36 directs the filter to adopt a 4 MHz bandwidth, the processor directs the clock to reduce the rate of the clock signal that it delivers to the analogue to digital converter 34 and the processor 36 so that digital processing is conducted at a lower sampling rate that is still nevertheless sufficient to capture the information content of a 4 MHz bandwidth signal. The use of a lower sampling rate for processing Wi-Fi signals translates into a reduced demand on the battery of the lap top computer 22.

The processor 36 may recognise a variety of circumstances when it is appropriate to switch the Wi-Fi transceiver from its high bandwidth mode to its low bandwidth mode. For example, the processor 36 might initiate the change to the low bandwidth mode upon detecting that the strength of received Wi-Fi signals exceeding a threshold and thereby implying that the lap top computer 22 is sufficiently close to the source of the Wi-Fi signals to receive those signals successfully in the reduced sensitivity, lower power consumption, lower bandwidth mode. Alternatively, the change to the low bandwidth mode may be initiated at times when the processor 36 predicts that an access point will transmit a signal suitable for reception in low bandwidth mode, such as a periodic DSSS beacon frame.

Figure 3:
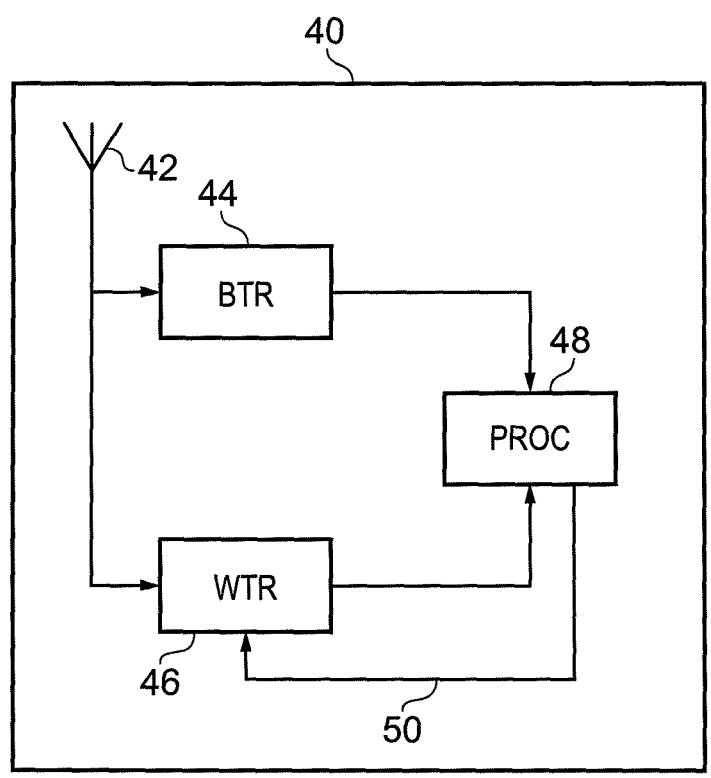
FIG. 3 is a block diagram schematically illustrating another cell phone.

FIG. 3 shows a cell phone 40 including an antenna 42 a Bluetooth transceiver 44, a Wi-Fi transceiver 46 and a processor 48. Wi-Fi and Bluetooth signals are received via antenna 42. The Bluetooth transceiver 44 imposes analogue channel filtering down to a bandwidth of 4 MHz whereas the Wi-Fi transceiver 46 imposes analogue channel filtering down to a broader 20 MHz. As discussed earlier with reference to FIG. 1, a Bluetooth transceiver can be used to receive Wi-Fi signals with reduced sensitivity. The processor 48 is arranged to direct the Bluetooth transceiver 44 to receive Wi-Fi signals when those signals are sufficiently strong whilst the Wi-Fi transceiver 46 is held in a reduced power, "sleep mode". When the processor determines that the Wi-Fi signals cannot be or are unlikely to be successfully received through the Bluetooth transceiver 44, then the Wi-Fi transceiver 46 is woken or powered up by a signal on line 50 to receive Wi-Fi signals instead of the Bluetooth transceiver 44. By operating in this way, Wi-Fi signals are received using the lower bandwidth of the Bluetooth transceiver 44 when possible, and, as discussed in relation to FIG. 2, the lower bandwidth translates into a lower sample rate which in turn translates into longer battery life for the cell phone 40.

From one perspective, the isolation of a WiFi signal using a filter with a bandwidth that is substantially narrower than the WiFi signal's bandwidth introduces additional intersymbol interference into the WiFi signal. Therefore, a WiFi signal recovered in a reduced bandwidth form can be subjected to equalisation (e.g. Viterbi equalisation or minimum mean square error equalisation) in order to reduce the ISI and improve the sensitivity of the WiFi reception despite the bandwidth constraint.

It is also possible to receive OFDM (Orthogonal Frequency Division Multiplexing) WiFi signals under a bandwidth limitation of the kind discussed above. In such circumstances, the edges (i.e., in the frequency domain) of the OFDM signal will be strongly attenuated but this will not always prevent recovery of information conveyed in OFDM sub-bands located at or near those edges.

The invention claimed is:

1. A method of receiving a Wi-Fi signal, the method comprising receiving at a Bluetooth receiver architecture a radio signal conveying the Wi-Fi signal and extracting the Wi-Fi signal from the radio signal by processing the radio signal through the Bluetooth receiver architecture, and determining from the Wi-Fi signal extracted through the Bluetooth receiver architecture information about a location of an access point that is a source of the Wi-Fi signal, wherein the Bluetooth receiver architecture filters the radio signal down to a bandwidth that is substantially less than the conveyed Wi-Fi signal's bandwidth.

2. The method according to claim 1, further comprising determining from the Wi-Fi signal extracted through the Bluetooth receiver architecture a need to utilise a Wi-Fi receiver architecture rather than the Bluetooth receiver architecture to extract a further Wi-Fi signal that is conveyed by a further radio signal.

3. A Wi-Fi receiver for recovering a Wi-Fi signal conveyed by a radio signal, the Wi-Fi receiver comprising a filter arranged to filter the acquired radio signal down to a bandwidth that is substantially less than the bandwidth of the conveyed Wi-Fi signal and a processor configured to determine, from the conveyed Wi-Fi signal, information about the location of an access point that is a source of the Wi-Fi signal.

4. The Wi-Fi receiver according to claim 3, wherein the filter is adjustable between at least two states being a first state in which the filter limits the bandwidth of the acquired radio signal to substantially less than the bandwidth of the conveyed Wi-Fi signal and a second state in which the filter limits the bandwidth of the acquired radio signal but not to a bandwidth that is substantially less than the bandwidth of the conveyed Wi-Fi signal.

5. The Wi-Fi receiver according to claim 4, further comprising an analogue to digital converter arranged to convert the radio signal as limited by the filter into a digital signal and wherein the analogue to digital converter is arranged to use a lower sample rate when the filter operates in the first state than when the filter operates in the second state.

6. The Wi-Fi receiver according to claim 4, further comprising a digital data processor arranged to perform digital processing on the radio signal as limited by the filter and wherein the processor is arranged to conduct that processing at a lower clock rate when the filter operates in the first state than when the filter operates in the second state.

7. A receiver comprising a Bluetooth receiver architecture, a Wi-Fi receiver architecture and a controller, wherein the controller is arranged to determine, from a Wi-Fi signal conveyed by a radio signal that is acquired by the receiver, information about the location of an access point that is a source of the Wi-Fi signal, and to determine which one of the Bluetooth receiver architecture and the WiFi receiver architecture is used to recover the WiFi signal that is conveyed by the radio signal that is acquired by the receiver.

8. The receiver according to claim 7, wherein the controller is arranged to wake a Wi-Fi receiver subsystem containing the Wi-Fi receiver architecture if the Wi-Fi receiver architecture is to be used in order to recover the Wi-Fi signal from the radio signal.

9. The receiver according to claim 7, wherein the controller modifies the Bluetooth receiver architecture to become the Wi-Fi receiver architecture if the Wi-Fi receiver architecture is to be used in order to recover the Wi-Fi signal from the radio signal.

10. The receiver according to claim 7 further comprising an analogue to digital converter arranged to convert the radio signal into a digital signal and wherein the analogue to digital converter is arranged to use a lower sample rate when the Bluetooth receiver architecture is used to recover the Wi-Fi signal than when the Wi-Fi receiver architecture is used to recover the Wi-Fi signal.

11. The receiver according to claim 7, further comprising a digital data processor arranged to perform digital processing on the radio signal and wherein the analogue to digital converter is arranged to use a lower sample rate when the Bluetooth receiver architecture is used to recover the Wi-Fi signal than when the Wi-Fi receiver architecture is used to recover the Wi-Fi signal.

12. A computer including a Wi-Fi receiver for recovering a Wi-Fi signal conveyed by a radio signal, the Wi-Fi receiver comprising a filter arranged to filter the acquired radio signal down to a bandwidth that is substantially less than the bandwidth of the conveyed Wi-Fi signal and a processor configured to determine, from the conveyed Wi-Fi signal, information about the location of an access point that is a source of the Wi-Fi signal.

13. A telephone including a Wi-Fi receiver for recovering a Wi-Fi signal conveyed by a radio signal, the Wi-Fi receiver comprising a filter arranged to filter the acquired radio signal down to a bandwidth that is substantially less than the bandwidth of the conveyed Wi-Fi signal and a processor configured to determine, from the conveyed Wi-Fi signal, information about the location of an access point that is a source of the Wi-Fi signal.

14. The method according to claim 1, wherein the location information describes a physical location of the access point.

15. The method according to claim 14, further comprising providing the information to a GPS unit for assistance in obtaining a positioning solution.

\* \* \* \* \*